(12) United States Patent
Chen

(10) Patent No.: US 11,216,144 B2
(45) Date of Patent: Jan. 4, 2022

(54) TOUCH STRUCTURE, TOUCH DISPLAY PANEL AND DRIVING METHOD

(71) Applicant: Xiamen Tianma Micro-Electronics Co., Ltd., Xiamen (CN)

(72) Inventor: Min Chen, Shanghai (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 16/878,575

(22) Filed: May 19, 2020

(65) Prior Publication Data

US 2020/0278765 A1    Sep. 3, 2020

(30) Foreign Application Priority Data

Dec. 25, 2019   (CN) .......................... 201911359502.2

(51) Int. Cl.
  *G06F 3/047*   (2006.01)
  *G06F 3/044*   (2006.01)
  *G06F 3/041*   (2006.01)

(52) U.S. Cl.
  CPC ............ *G06F 3/047* (2013.01); *G06F 3/0412* (2013.01); *G06F 3/0445* (2019.05); *G06F 3/0446* (2019.05); *G06F 2203/04111* (2013.01)

(58) Field of Classification Search
  CPC .. G06F 2203/04111; G06F 2203/04112; G06F 3/0412; G06F 3/0445; G06F 3/0446; G06F 3/047
  See application file for complete search history.

(56) References Cited

U.S. PATENT DOCUMENTS

2017/0153736 A1    6/2017   Kim et al.

FOREIGN PATENT DOCUMENTS

CN         108108048 A        6/2018

*Primary Examiner* — Kenneth Bukowski
(74) *Attorney, Agent, or Firm* — Kilpatrick Townsend & Stockton, LLP

(57) ABSTRACT

Provided are a touch structure, a touch display panel and a driving method. The touch structure includes a plurality of touch driving electrodes, a plurality of touch sensing electrodes and a plurality of additional touch driving electrodes, where the plurality of touch driving electrodes, the plurality of touch sensing electrodes and the plurality of additional touch driving electrodes are insulated from each other. The plurality of touch driving electrodes and the plurality of additional touch driving electrodes extend along a first direction and are arranged along a second direction, and the plurality of touch sensing electrodes extend along the second direction and are arranged along the first direction, where the first direction is intersected with the second direction. Each of the plurality of additional touch driving electrodes corresponds to a respective one of the plurality of touch driving electrodes.

17 Claims, 14 Drawing Sheets

--Prior Art--

TOUCH STRUCTURE, TOUCH DISPLAY PANEL AND DRIVING METHOD

CROSS-REFERENCES TO RELATED APPLICATIONS

This application claims the priority to a Chinese patent application No. CN 201911359502.2 filed at the CNIPA on Dec. 25, 2019, disclosure of which is incorporated herein by reference in its entirety.

FIELD

Embodiments of the present disclosure relate to the field of display technologies, in particular, to a touch structure, a touch display panel and a driving method.

BACKGROUND

With the development of display technologies, touch screens have been widely used. According to different working principles, the touch panels are divided into a resistive touch screen, a self-capacitance touch screen, a mutual-capacitance touch screen, an infrared touch screen and the like. The mutual-capacitance touch screen includes touch driving electrodes and touch sensing electrodes. In a case where a driving signal is inputted into a touch driving electrode, the touch sensing electrode couples with the touch driving electrode to form mutual capacitance and coupling capacitance is formed between a finger and the touch driving electrode to cause a change in an output signal of the touch sensing electrode, and a position of a touch point is determined based on this.

In the related art, driving is generally performed in a manner of time-division scanning for display and touch. In a touch scanning cycle, touch scanning signals are outputted to the touch driving electrodes by a driving chip step by step. Before all touch driving electrodes are scanned, the scanned touch driving electrodes cannot be scanned, continuous touch in a same region cannot be detected completely, and a low touch point reporting rate is resulted.

SUMMARY

Embodiments of the present disclosure provide a touch structure, a touch display panel and a driving method for improving the touch point reporting rate.

In one embodiment, a touch structure is provided in an embodiment of the present disclosure and includes a plurality of touch driving electrodes, a plurality of touch sensing electrodes and a plurality of additional touch driving electrodes, where the plurality of touch driving electrodes, the plurality of touch sensing electrodes and the plurality of additional touch driving electrodes are insulated from each other.

The plurality of touch driving electrodes are extended along a first direction and are arranged along a second direction, the plurality of touch sensing electrodes extend along the second direction and are arranged along the first direction, and the plurality of additional touch driving electrodes extend along the first direction and are arranged along the second direction, where the first direction is intersected with the second direction.

Each of the plurality of additional touch driving electrodes corresponds to a respective one of the plurality of touch driving electrodes, and the each of the plurality of additional touch driving electrodes at least has an overlapped portion with the respective one of the plurality of touch driving electrodes.

The each of the plurality of touch driving electrodes has a touch driving cycle, and in the touch driving cycle, in condition that a touch operation is detected at a corresponding position of the each of the plurality of touch driving electrodes, after a first effective driving pulse signal of the touch driving cycle ends, a second effective driving pulse signal is applied to a respective one of the plurality of additional touch driving electrodes corresponding to the each of the plurality of touch driving electrodes.

In one embodiment, a touch display panel is provided in an embodiment of the present disclosure and includes any touch structure provided in the first aspect.

In a third aspect, a touch driving method is provided in an embodiment of the present disclosure and is applicable to any touch structure provided in the first aspect. The touch driving method includes steps described below.

A first effective driving pulse signal is inputted to a respective one of a plurality of touch driving electrodes in turn.

In a touch driving cycle, in condition that a touch operation is detected at a corresponding position of each of the plurality of touch driving electrodes, after the first effective driving pulse signal of the touch driving cycle ends, a second effective driving pulse signal is applied to a respective one of a plurality of additional touch driving electrodes corresponding to the each of the plurality of touch driving electrodes.

Embodiments of the present disclosure, the plurality of additional touch driving electrodes are set. The each of the plurality of additional touch driving electrodes corresponds to a respective one of the plurality of touch driving electrodes, and in the touch driving cycle, in condition that the touch operation is detected at a corresponding position of the each of the plurality of touch driving electrodes, after the first effective driving pulse signal of the touch driving cycle ends, the second effective driving pulse signal is applied to a respective one of the plurality of additional touch driving electrodes corresponding to the each of the plurality of touch driving electrodes. With the touch driving electrode, the touch operation can be detected under the action of the first effective driving pulse signal. In a touch driving cycle, after the first effective driving pulse signal ends, the second effective driving pulse signal is applied to the additional touch driving electrode, and mutual-capacitance is generated between the additional touch driving electrode and the touch sensing electrode. In a case where the touch operation is performed again in a region corresponding to the touch driving electrode acted on by the first effective driving pulse signal, the capacitance between the additional touch driving electrode and the touch sensing electrode is changed, and the touch operation in the region is detected again, and thus detection of multiple touch operations in a same region is achieved, and the touch point reporting rate is improved.

BRIEF DESCRIPTION OF DRAWINGS

Embodiments of the present disclosure provide a brief introduction to the drawings required in the description of the embodiments will be given below. Apparently, the drawings are merely drawings of part, not all, of the embodiments of the present disclosure to be described.

DETAILED DESCRIPTION

Figure 1:
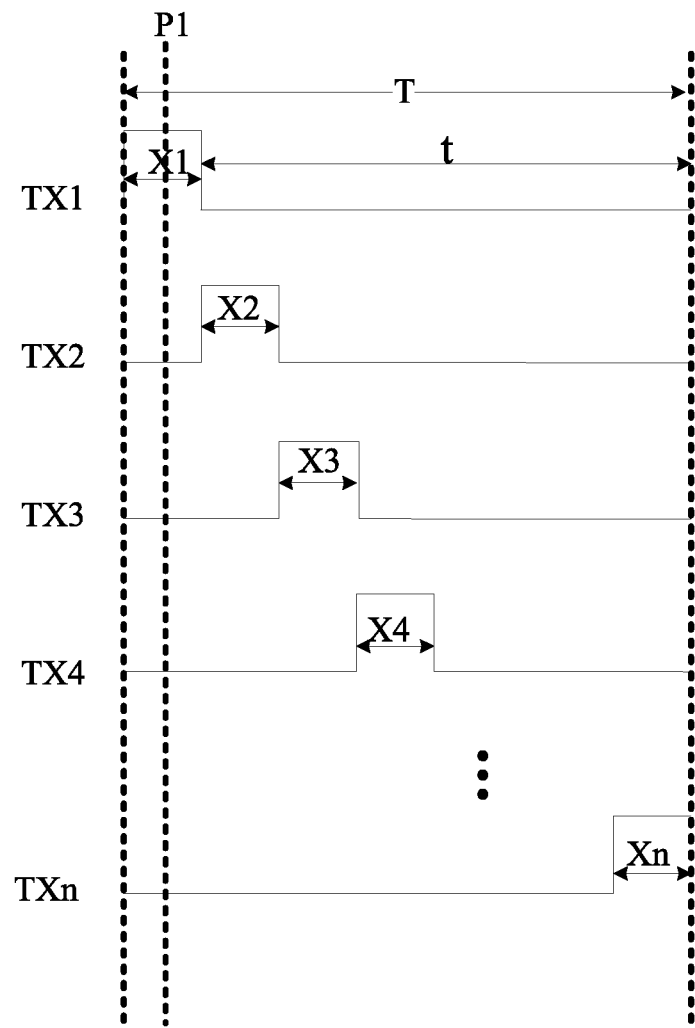
FIG. 1 is a touch driving timing diagram in the related art.

The present application will be further described in detail with reference to the drawings and embodiments. It is to be understood that the embodiments set forth below are intended to illustrate and not to limit the present application. It is to be noted that to facilitate description, only part, not all, of structures related to the present application are illustrated in the drawings.

FIG. 1 is a touch driving timing diagram in the related art. Referring to FIG. 1, FIG. 1 exemplarily labels n touch driving electrodes as TX1 to TXn in turn, where n is a positive integer. A first effective driving pulse signal applied to a touch driving electrode TXi is labeled as Xi. i is an integer greater than or equal to 1 and less than or equal to n. In a touch driving cycle, the first effective driving pulse signals are supplied to n touch driving electrodes one by one. A touch driving cycle T is exemplary illustrated in FIG. 1.

Referring to FIG. 1, in the touch driving cycle T, during the period when a first effective driving pulse signal X1 is applied to a touch driving electrode TX1, a touch operation is detected, that is, the touch operation is detected at a dashed line P1 in FIG. 1. After the first effective driving pulse signal X1 of the touch driving electrode TX1 ends, if a touch is performed again at the position, due to the fact that the touch driving electrode TX1 has no first effective driving pulse signal X1 at this time, during the period after the first effective driving pulse signal X1 ends in the touch driving cycle T, that is, within the time period t in FIG. 1, if a finger touch exists, the touch operation cannot be detected. Therefore the existing touch structure is subject to the influence of low touch reporting point rate.

Figure 2:
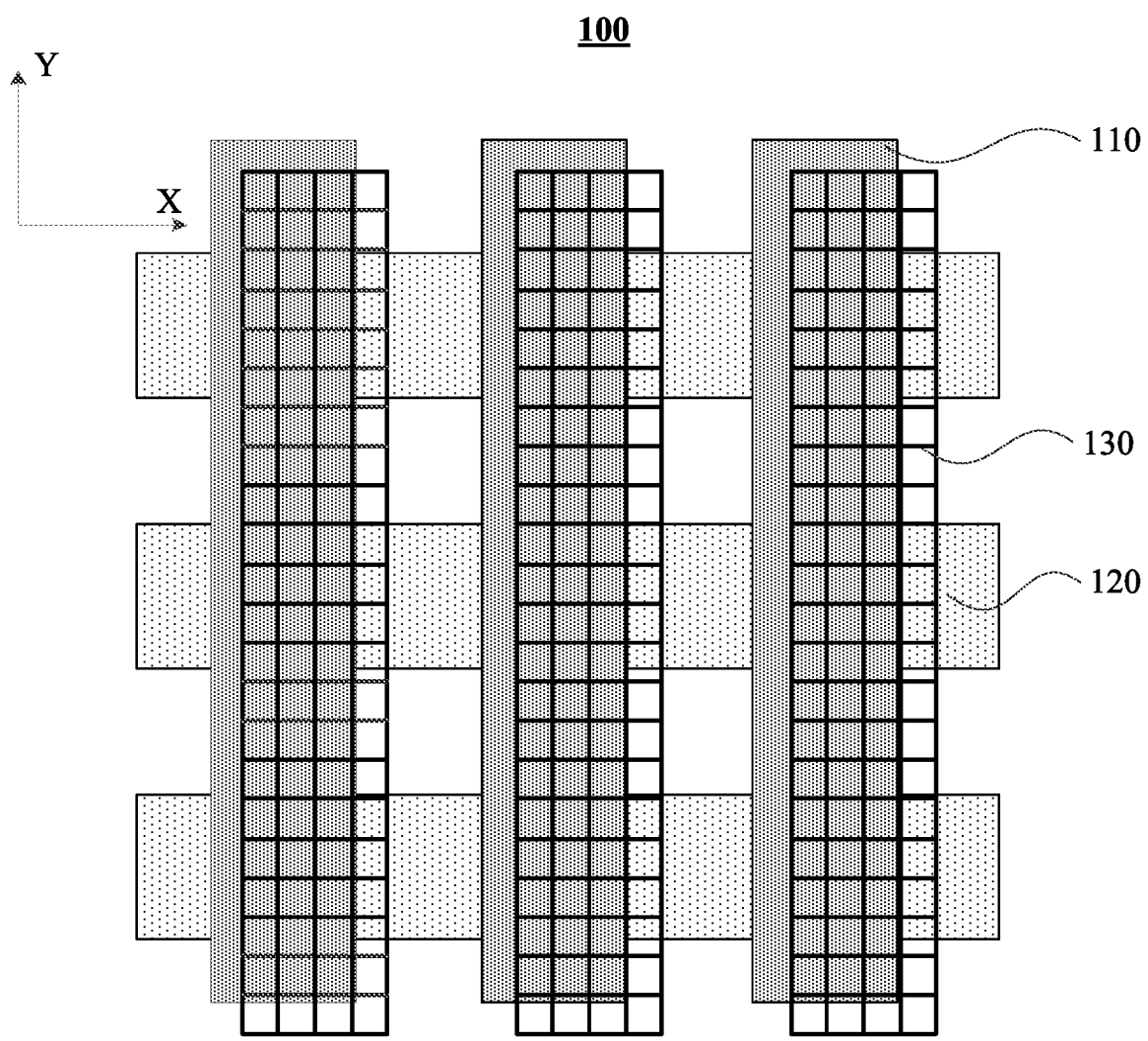
FIG. 2 is a partial structural diagram of a touch structure according to an embodiment of the present disclosure.

In view of this, an embodiment of the present disclosure provides a touch structure. FIG. 2 is a partial structural diagram of a touch structure according to an embodiment of the present disclosure. Referring to FIG. 2, the touch structure 100 includes a plurality of touch driving electrodes 110, a plurality of touch sensing electrodes 120 and a plurality of additional touch driving electrodes 130, where the plurality of touch driving electrodes 110, the plurality of touch sensing electrodes 120 and the plurality of additional touch driving electrodes 130 are insulated from each other.

The plurality of touch driving electrodes 110 extend along a first direction and are arranged along a second direction, the plurality of touch sensing electrodes 120 extend along the second direction and are arranged along the first direction, and the plurality of additional touch driving electrodes 130 extend along the first direction and are arranged along the second direction, where the first direction is intersected with the second direction. In FIG. 2, the first direction is Y-direction, and the second direction is X-direction.

Each of the plurality of additional touch driving electrodes 130 corresponds to a respective one of the plurality of touch driving electrodes 110, and the each of the plurality of additional touch driving electrodes 130 at least has an overlapped portion with the respective one of the plurality of touch driving electrodes 110.

A touch driving electrode 110 has a touch driving cycle, and in the touch driving cycle, if a touch operation is detected at a corresponding position of the touch driving electrode 110, after a first effective driving pulse signal of the touch driving cycle ends, a second effective driving pulse signal is applied to the additional touch driving electrode 130 in one-to-one correspondence with the touch driving electrode 110.

Each touch driving electrode 110 has one additional touch driving electrode 130 corresponding thereto, and the additional touch driving electrodes 130 and the touch driving electrodes 110 have the same extension direction and arrangement direction. Capacitance can be formed between the touch driving electrode 110 and the plurality of touch sensing electrodes 120, each additional touch driving electrode 130 corresponds to a respective one of the touch driving electrodes 110, and the each additional touch driving electrode 130 at least has an overlapped portion with the respective one of the touch driving electrodes 110, and therefore the capacitance can also be formed between the additional touch driving electrode 130 and the plurality of touch sensing electrodes 120.

Figure 3:
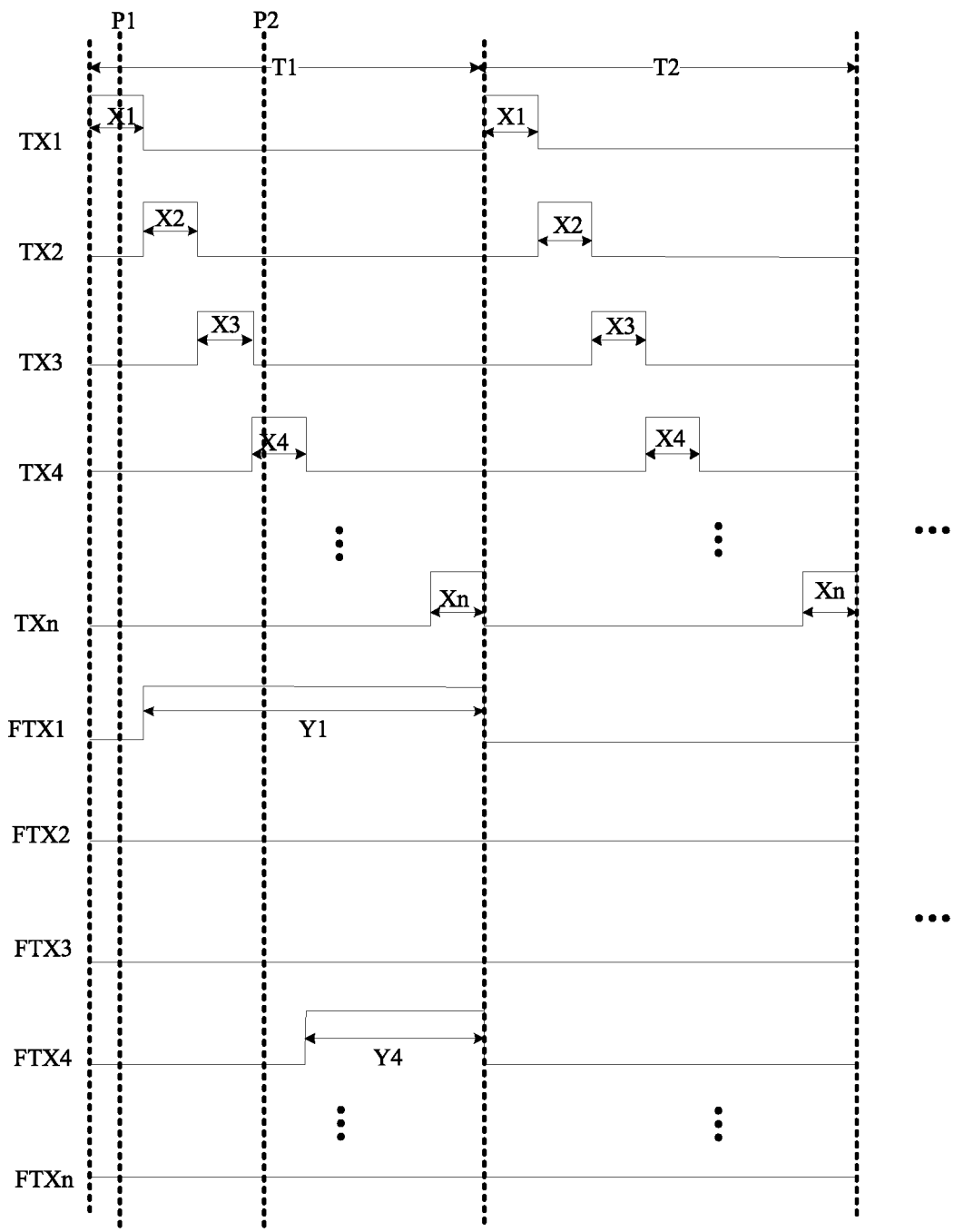
FIG. 3 is a touch driving timing diagram according to an embodiment of the present disclosure.

FIG. 3 is a touch driving timing diagram according to an embodiment of the present disclosure. Referring to FIG. 3, FIG. 3 exemplarily labels n touch driving electrodes as TX1 to TXn in turn, where n is a positive integer. The first effective driving pulse signal applied to a touch driving electrode TXi is labeled as Xi. i is a positive integer greater than or equal to 1 and less than or equal to n. n additional touch driving electrodes are labeled as FTX1 to FTXn in turn, and the second effective driving pulse signal applied to an additional touch driving electrode FTXi is labeled as Yi, where i is a positive integer greater than or equal to 1 and less than or equal to n. The touch driving electrode TXi corresponds to the additional touch driving electrode FTXi. In the touch driving cycle, the first effective driving pulse signals are supplied to n touch driving electrodes one by one. Two touch driving cycles T1 and T2 are exemplary illustrated in FIG. 3.

If the first effective driving pulse signal is applied to the touch driving electrode, the capacitance is formed between the touch driving electrode and the touch sensing electrodes, and if a finger touches the touch driving electrode at this time, the capacitance between the touch driving electrode and the touch sensing electrodes is changed, and then the touch sensing electrodes output the changed capacitance signal to detect a position of the finger touch. Referring to FIG. 3, in first touch driving cycle T1, during the period when the first effective driving pulse signal X1 is applied to the touch driving electrode TX1, a touch operation is detected, that is, at the dashed line P1 in FIG. 2, after the first effective driving pulse signal X1 of the touch driving electrode TX1 ends, a second effective driving pulse signal Y1 is applied to an additional touch driving electrode FTX1 corresponding to the touch driving electrode TX1, and the second effective driving pulse signal Y1 continues until the end of the touch driving cycle T1. During the period when the first effective driving pulse signal X1 is applied to the touch driving electrode TX1, touch position detection is performed through the touch driving electrode TX1 and each touch sensing electrode, and after the first effective driving pulse signal X1 ends, due to the fact that the second effective driving pulse signal Y1 is applied to the additional touch driving electrode FTX1, the touch position detection can further be performed through the additional touch driving electrode FTX1 and the each touch sensing electrode. Therefore, throughout the first touch driving cycle T1, the touch position detection can be performed at all time at the position where the touch driving electrode TX1 and the additional touch driving electrode FTX1 are located.

In first touch driving cycle T1, during the period when a first effective driving pulse signal X2 is applied to a touch driving electrode TX2, no touch operation exists at the position. Therefore, throughout the first touch driving cycle T1, an additional touch driving electrode FTX2 in one-to-one correspondence with the touch driving electrode TX2 does not need to be applied with a second effective driving pulse signal Y2. Similarly, an additional touch driving electrode FTX3 does not need to be applied with a second effective driving pulse signal Y3.

In the first touch driving cycle T1, during the period when a first effective driving pulse signal X4 is applied to a touch driving electrode TX4, a touch operation is detected at the position, that is, at the dashed line P1 in FIG. 2, after the first effective driving pulse signal X4 of the touch driving electrode TX4 ends, a second effective driving pulse signal Y4 is applied to an additional touch driving electrode FTX4 corresponding to the touch driving electrode TX4, and the second effective driving pulse signal Y4 continues until the end of the touch driving cycle T1. During the period when the first effective driving pulse signal X4 is applied to the touch driving electrode TX4, the touch position detection is performed through the touch driving electrode TX4 and each touch sensing electrode, after the first effective driving pulse signal X4 ends, due to the fact that the second effective driving pulse signal Y4 is applied to the additional touch driving electrode FTX4, the touch position detection can further be performed through the additional touch driving electrode FTX4 and the each touch sensing electrode. Therefore, throughout the first touch driving cycle T1, the touch position detection can be performed at all time at the position where the touch driving electrode TX4 and the additional touch driving electrode FTX4 are located.

In the second touch driving cycle T2, during the period when a first effective driving pulse signal is applied to each touch driving electrode, no touch is detected. Therefore, no additional touch driving electrode needs to be applied with a second effective driving pulse signal.

In conclusion, in each touch driving cycle, during the period when the first effective driving pulse signal is applied to the touch driving electrode, the touch position can be detected through the touch driving electrode and the each touch sensing electrode; if a touch operation is detected, the second effective driving pulse signal can be applied to the additional touch driving electrode corresponding to the touch driving electrode at the position after the first effective driving pulse signal of the touch driving cycle ends, and thus, in the time period without the first effective driving pulse signal, the touch position is detected through the additional touch driving electrode and the each touch sensing electrode, and the effect of improving the touch point reporting rate is achieved. For example, in a case where a game operation is performed and an operation of frequent touch clicks is required, a smooth single-point combo game operation experience can be achieved.

The first effective driving pulse signal and the second effective driving pulse signal are exemplarily set to a high level in FIG. 3, and in other embodiments, the first effective driving pulse signal and the second effective driving pulse signal may be set to a low level according to the requirements of a display panel, which is not limited in the embodiments of the present disclosure.

In one embodiment, the additional touch driving electrode may be a transparent conducting thin film and may further include grid metal wires, as shown in FIG. 2. Still referring to FIG. 2, gap exists between the grid metal wires, and light beams emitted by a display apparatus may be emitted out through the gap. Therefore, the influence on the opening rate of the display apparatus can be reduced by adding the additional touch driving electrode 130. In addition, compared with an additional touch driving electrode 130 made of a transparent conducting thin film material, an additional touch driving electrode 130 made of grid metal wires can also reduce impedance.

In one embodiment, the plurality of touch driving electrodes and the plurality of touch sensing electrodes are disposed in a same layer.

Figure 4:
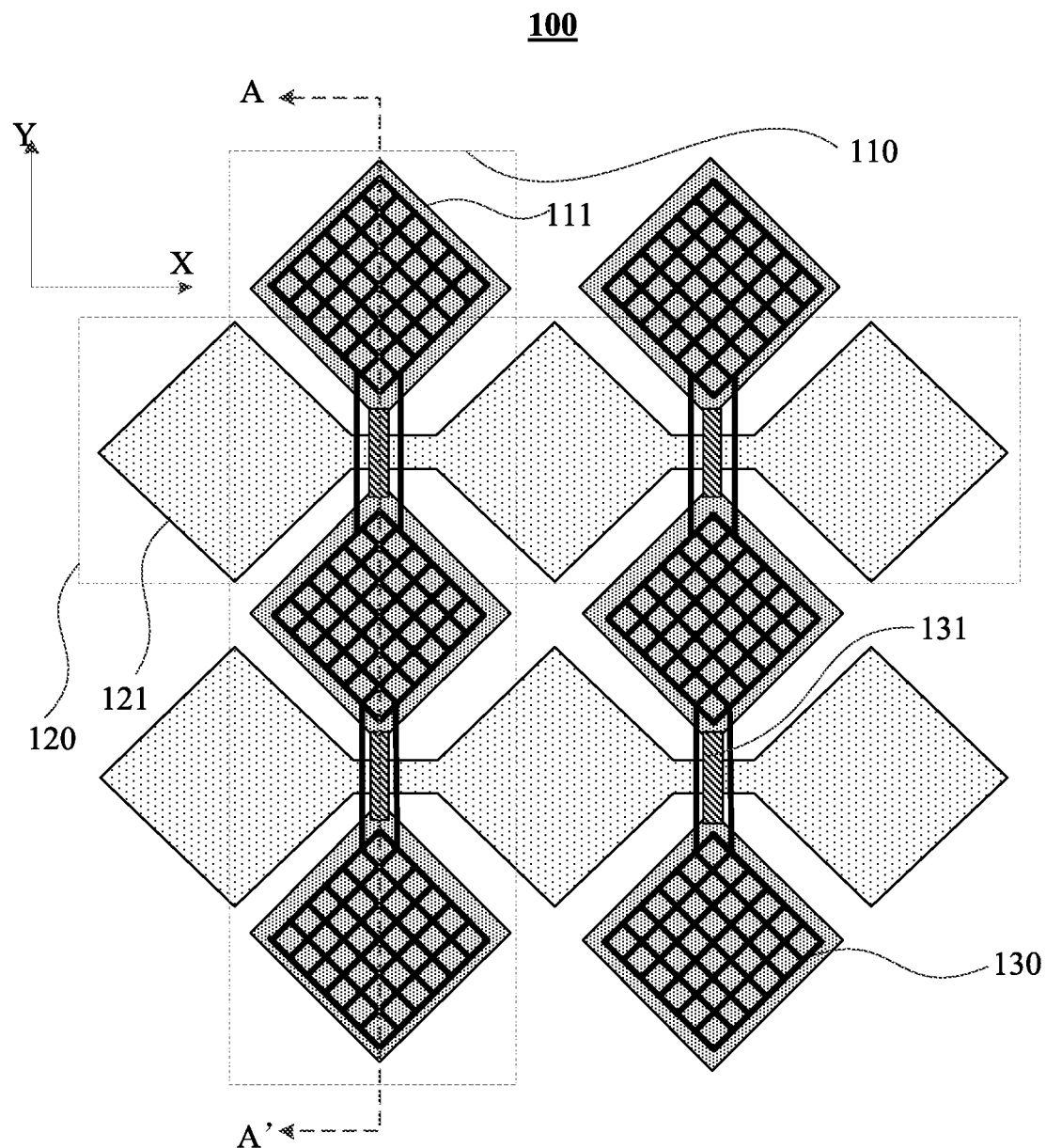
FIG. 4 is a partial structural diagram of another touch structure according to an embodiment of the present disclosure.

FIG. 4 is a partial structural diagram of another touch structure according to an embodiment of the present disclosure. Referring to FIG. 4, the touch driving electrode 110 includes a plurality of sub-touch driving electrodes 111 sequentially disposed in the first direction, and two adjacent sub-touch driving electrodes 111 in the first direction are electrically connected each other through a metal bridge 131. The additional touch driving electrode 130 and the metal bridge 131 are disposed in the same layer.

Figure 5:
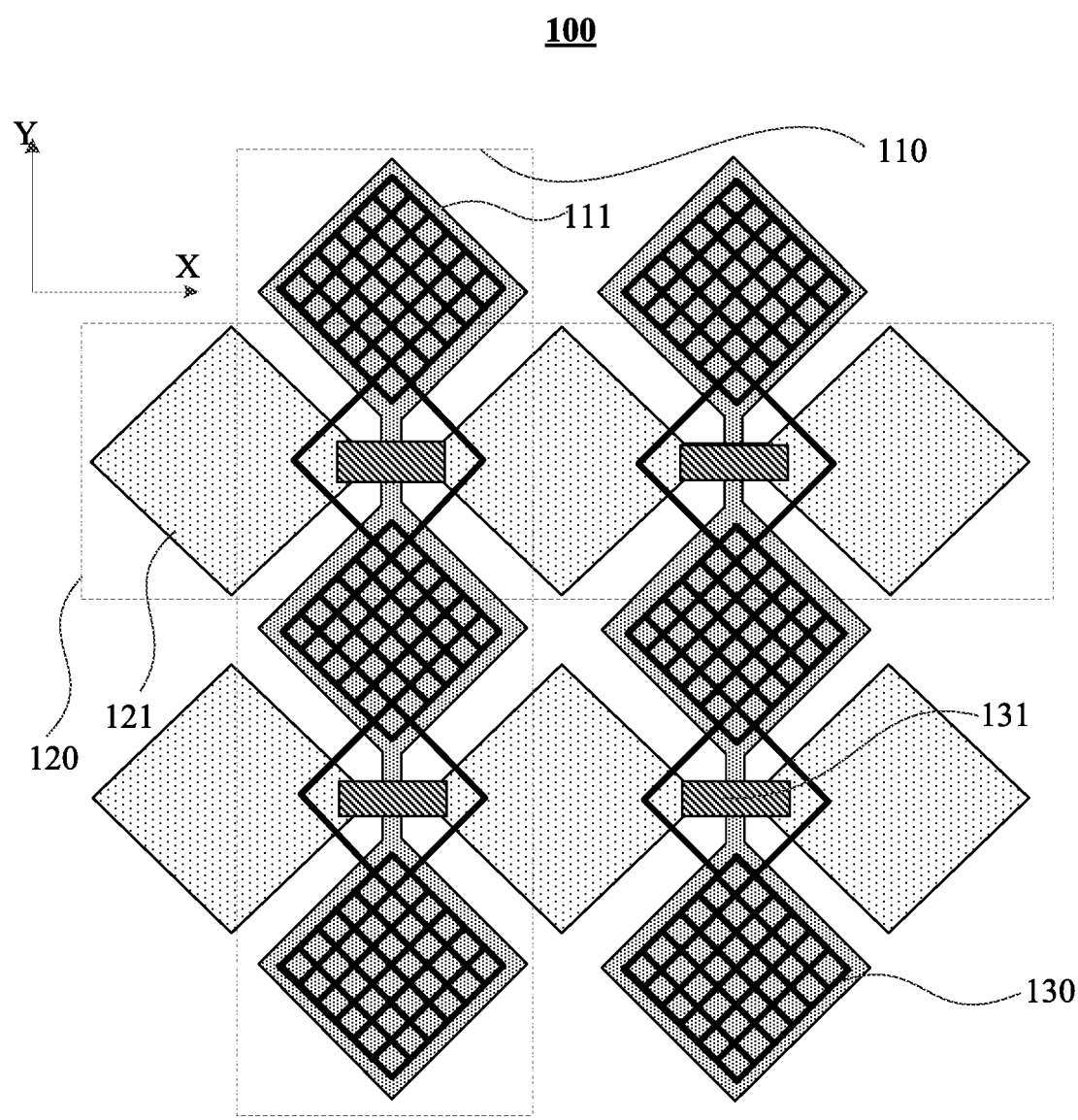
FIG. 5 is a partial structural diagram of another touch structure according to an embodiment of the present disclosure.

FIG. 5 is a partial structural diagram of another touch structure according to an embodiment of the present disclosure. Referring to FIG. 5, the touch sensing electrode 120 includes a plurality of sub-touch sensing electrodes 121 sequentially disposed in the second direction, and two adjacent sub-touch sensing electrodes 121 in the second direction are electrically connected each other through the metal bridge 131. The additional touch driving electrode 130 and the metal bridge 131 are disposed in the same layer.

The plurality of touch driving electrodes 110 and the plurality of touch sensing electrodes 120 are disposed in the same layer. Therefore, the plurality of touch driving electrodes 110 and the plurality of touch sensing electrodes 120 may be formed by using a same material in a same process. The additional touch driving electrode 130 and the metal bridge 131 are disposed in the same layer. Therefore, the additional touch driving electrode 130 and the metal bridge 131 may be formed by using a same material in a same process, and with the above-mentioned embodiments, the process can be simplified, the number of masks can be reduced, and the cost can be reduced.

Figure 6:
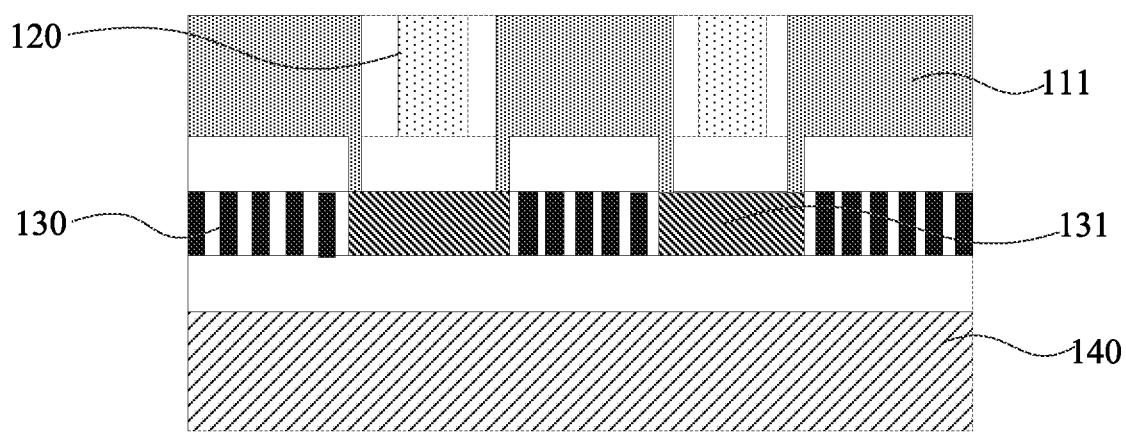
FIG. 6 is a cross-sectional view of FIG. 4 taken along a section line A-A'.

In one embodiment, the touch structure further includes a base substrate; the plurality of touch driving electrodes and the plurality of touch sensing electrodes are disposed on one side of the base substrate; and the metal bridge is disposed on one side, facing towards the base substrate, of a film layer where the plurality of touch driving electrodes are located. FIG. 6 is a cross-sectional view of FIG. 4 taken along the section line A-A'. Referring to FIG. 6, the touch structure 100 further includes the base substrate 140; the plurality of touch driving electrodes and the plurality of touch sensing electrodes are disposed on one side of the base substrate 140; and the metal bridge 131 is disposed on one side, facing towards the base substrate 140, of the film layer where the plurality of touch driving electrodes are located.

Exemplarily, as shown in FIG. 6, the touch driving electrode includes the plurality of sub-touch driving electrodes 111, and two adjacent sub-touch driving electrodes 111 are connected each other through the metal bridge 131, and the plurality of sub-touch driving electrodes 111 and the plurality of touch sensing electrodes 120 are disposed on one side of the base substrate 140. The metal bridge 131 can reflect the light beams emitted from the display apparatus, and after the reflected beam is emitted from the display apparatus, the metal bridge 131 is visible on the display panel. Therefore, the metal bridge 131 is disposed on one side, facing towards the base substrate 140, of the film layer where the plurality of sub-touch driving electrodes 111 are located, that is, the metal bridge 131 is disposed on one side, facing towards the base substrate 140, of the film layer where the plurality of touch driving electrodes are located, and a problem of metal visibility caused through the metal bridge 131 can be avoided. FIG. 6 merely exemplarily shows the touch driving electrode and the touch sensing electrode are disposed in the same layer. In other embodiments, the touch driving electrode and the touch sensing electrode may further be disposed in different layers, and electrical insulation is implemented by providing an insulating layer between a plane where the touch driving electrode is located and a plane where the touch sensing electrode is located.

In one embodiment, an area of an additional touch driving electrode 130 is the same as an area of the touch driving electrode 110 in one-to-one correspondence with the additional touch driving electrode 130.

Figure 7:
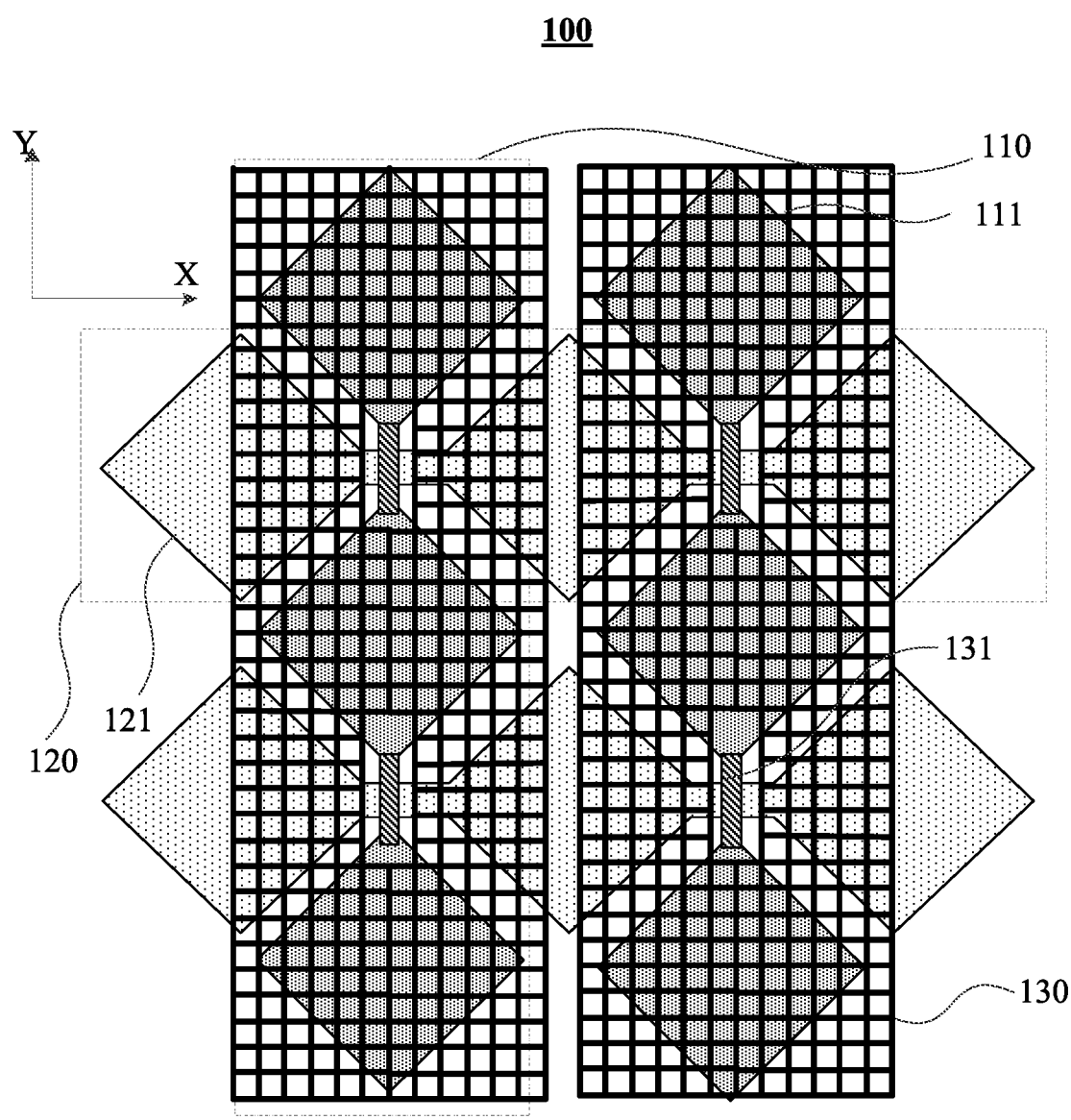
FIG. 7 is a structural diagram of another touch structure according to an embodiment of the present disclosure.

Specifically, the additional touch driving electrode 130 may be configured as a planar transparent electrode and may also be configured as the grid metal wires. If the additional touch driving electrode 130 is configured as the planar transparent electrode (not shown), the area of the additional touch driving electrode 130 is the same as the area of the touch driving electrode 110 in one-to-one correspondence with the additional touch driving electrode 130, which refers to that an outline of the additional touch driving electrode 130 coincides with an outline of the touch driving electrode 110; and if the additional touch driving electrode 130 is provided as the grid metal wires, as shown in FIG. 7, the area of the additional touch driving electrode 130 is the same as the area of the touch driving electrode 110 in one-to-one correspondence with the additional touch driving electrode 130, where the area of the additional touch driving electrode 130 refers to the sum of the areas of all the grid metal wires of the additional touch driving electrode 130. Since the gap exists between metal wires, the contour of the additional touch driving electrode 130 is greater than the contour of the touch driving electrode 110 in one-to-one correspondence with the additional touch driving electrode 130.

Under the action of the first effective pulse signal, first mutual-capacitance is generated between the touch driving electrode 110 and the touch sensing electrode 120, and a first capacitance value is taken as basic data to detect a touch action. Under the action of the second effective pulse signal, second mutual-capacitance is generated between the additional touch driving electrode 130 and the touch sensing electrode 120, and a second capacitance value is taken as the basic data to detect the touch action. In order to more accurately detect whether the touch operation exists, the second capacitance value and the first capacitance value need to be made equal to each other, and therefore, the area of the additional touch driving electrode 130 needs to be set the same as the area of the touch driving electrode 110 in one-to-one correspondence with the additional touch driving electrode 130.

In one embodiment, the outline of the additional touch driving electrode 130 coincides with the outline of the touch driving electrode 110 in one-to-one correspondence with the additional touch driving electrode 130.

Specifically, in the process of the touch operation detection, if the overlapped region between the additional touch driving electrode 130 and the touch sensing electrode 120 and the overlapped region between the touch driving electrode 110 and the touch sensing electrode 120 change, the difference in the capacitance detected near a touch point also changes accordingly, and the accuracy of the touch operation detection is affected. Therefore, the contour of the additional touch driving electrode 130 may be set to coincide with the contour of the touch driving electrode 110 in one-to-one correspondence with the additional touch driving electrode 130, so that the overlapped region between the additional touch driving electrode 130 and the touch sensing electrode 120 and the overlapped region between the touch driving electrode 110 and the touch sensing electrode 120 are the same, and the accuracy of the touch operation detection is ensured as much as possible. In addition, due to the fact that the contour of the additional touch driving electrode 130 coincide with the contour of the touch driving electrode 110 in one-to-one correspondence with the additional touch driving electrode 130, the additional touch driving electrode 130 does not block other touch driving electrodes 110, so that the additional touch driving electrodes 130 can also be prevented from interfering with signals on other touch driving electrodes 110 in the touch process.

Figure 8:
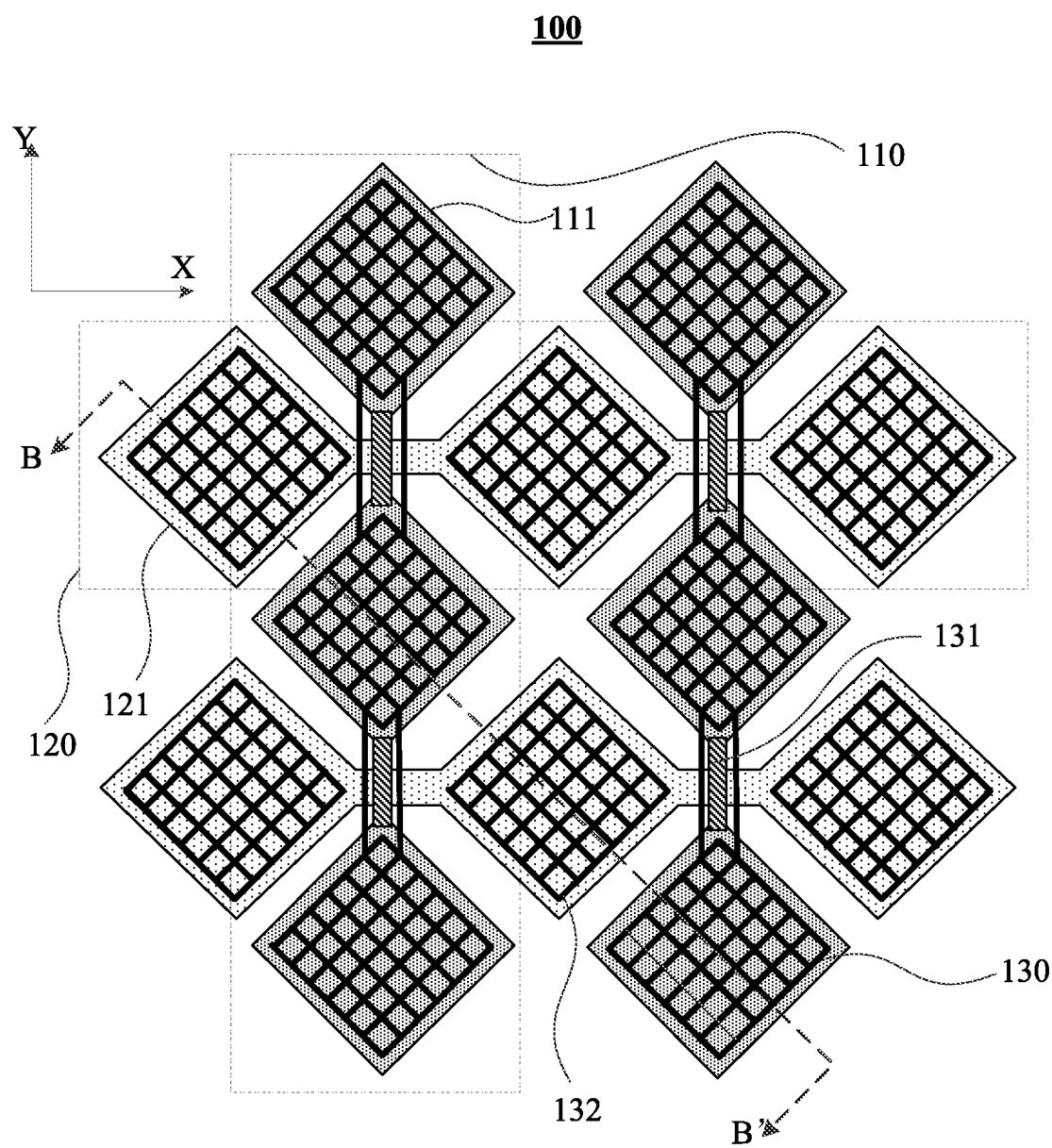
FIG. 8 is a structural diagram of another touch structure according to an embodiment of the present disclosure.
Figure 9:
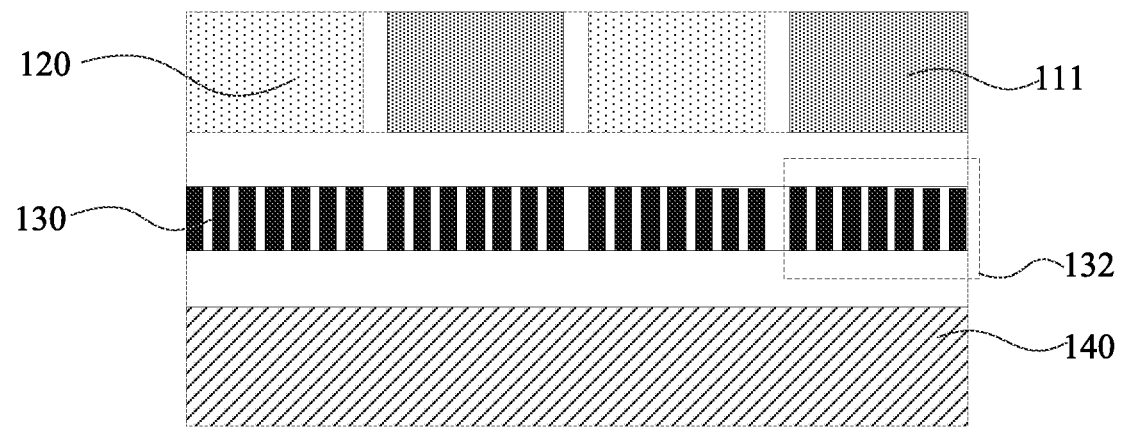
FIG. 9 is a cross-sectional view of FIG. 8 taken along a section line B-B'.

In one embodiment, FIG. 8 is a structural diagram of another touch structure according to an embodiment of the present disclosure. FIG. 9 is a partial cross-sectional view of FIG. 8 taken along the section line BB'. Combining with FIGS. 8 and 9, the touch structure 100 further includes a virtual touch electrode 132, where the virtual touch electrode 132 is disposed between adjacent additional touch driving electrodes 130, and the virtual touch electrode 132 and the additional touch driving electrode 130 are insulated from each other and are disposed in the same layer.

According to the embodiments of the present disclosure, the virtual touch electrode 132 is disposed in the same layer as and between adjacent additional touch driving electrodes 130, so that the uniformity of a display region can be increased during the display process of a panel. The display difference between the region provided with the additional touch driving electrode 130 and the region between the adjacent additional touch driving electrodes 130 is avoided.

It is to be noted that, FIG. 9 exemplarily shows that the touch driving electrode and the touch sensing electrode are disposed in the same layer. In other embodiments, the touch driving electrode and the touch sensing electrode may further be disposed in different layers, and the electrical insulation is implemented by providing the insulating layer between the plane where the touch driving electrode is located and the plane where the touch sensing electrode is located.

In one embodiment, a value of capacitance between the touch driving electrode 110 and the touch sensing electrode 120 is C1, and a value of capacitance between the additional touch driving electrode 130 corresponding to the touch driving electrode 110 and the touch sensing electrode 120 is C2.

In condition that C1 is equal to C2, an amplitude of the first effective driving pulse signal is equal to an amplitude of the second effective driving pulse signal.

In condition that C1 is greater than C2, the amplitude of the first effective driving pulse signal is smaller than the amplitude of the second effective driving pulse signal.

In condition that C1 is less than C2, the amplitude of the first effective driving pulse signal is greater than the amplitude of the second effective driving pulse signal.

To ensure the accuracy of the touch operation detection, it is necessary to ensure that when the touch operation exists, a sensing signal detected by the touch sensing electrode 120 during the first effective driving pulse signal is the same as a sensing signal detected by the touch sensing electrode 120 during the second effective driving pulse signal.

In a case where the touch operation exists, the touch signal detected by the touch sensing electrode 120 during the first effective driving pulse signal is related to the following factors: 1. the value of capacitance C1 between the touch driving electrode 110 and the touch sensing electrode 120; 2. the magnitude of the first effective driving pulse signal. The greater the value of capacitance C1 between the touch driving electrode 110 and the touch sensing electrode 120, the greater the sensing signal detected by the touch sensing electrode 120. The greater the first effective driving pulse signal, the greater the sensing signal detected by the touch sensing electrode 120.

In a case where the touch operation exists, the touch signal detected by the touch sensing electrode 120 during the second effective driving pulse signal is related to the following factors: 1. the value of capacitance C2 between the additional touch driving electrode 130 and the touch sensing electrode 120; 2. the magnitude of the second effective driving pulse signal. The greater the value of capacitance C2 between the additional touch driving electrode 130 and the touch sensing electrode 120, the greater the touch signal detected by the touch sensing electrode 120. The greater the second effective driving pulse signal, the greater the touch signal detected by the touch sensing electrode 120.

Therefore, if C1 is equal to C2, the first effective driving pulse signal may be set to be equal to the second effective driving pulse signal, and when the touch operation exists, the sensing signal detected by the touch sensing electrode 120 during the first effective driving pulse signal is the same as the sensing signal detected by the touch sensing electrode 120 during the second effective driving pulse signal.

If C1 is greater than C2, the first effective driving pulse signal may be set to be smaller than the second effective driving pulse signal, and when the touch operation exists, the sensing signal detected by the touch sensing electrode 120 during the first effective driving pulse signal is the same as the sensing signal detected by the touch sensing electrode 120 during the second effective driving pulse signal.

If C1 is less than C2, the first effective driving pulse signal may be set to be greater than the second effective driving pulse signal, and when the touch operation exists, the sensing signal detected by the touch sensing electrode 120 during the first effective driving pulse signal is the same as the sensing signal detected by the touch sensing electrode 120 during the second effective driving pulse signal.

Figure 10:
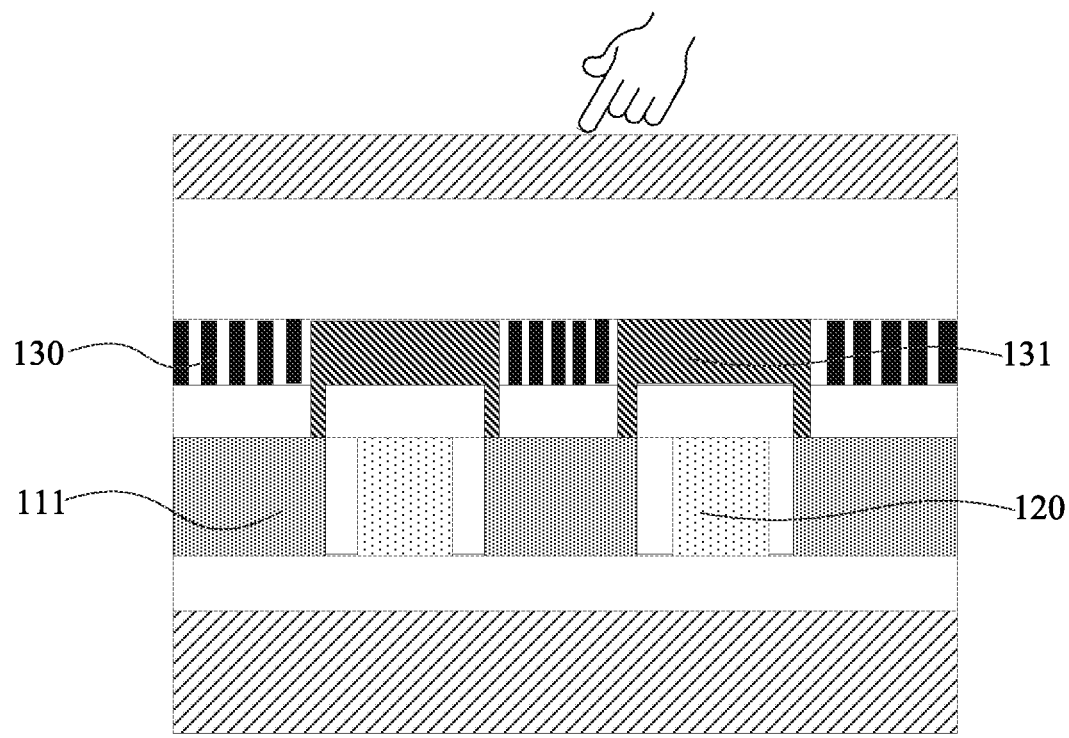
FIG. 10 is another partial cross-sectional view taken along the section line A-A' according to an embodiment of the present disclosure.

In one embodiment, one side, facing away from the touch driving electrode, of the additional touch driving electrode is a touch side. FIG. 10 is another partial cross-sectional view taken along the section line A-A' according to an embodiment of the present disclosure. As shown in FIG. 10, the area of the additional touch driving electrode 130 is smaller than the area of the touch driving electrode corresponding to the additional touch driving electrode 130, and/or, the amplitude of the first effective driving pulse signal is greater than the amplitude of the second effective driving pulse signal.

Exemplarily, as shown in FIG. 10, the touch driving electrode includes a plurality of sub-touch driving electrodes 111, and two adjacent sub-touch driving electrodes 111 are connected each other through the metal bridge 131. The additional touch driving electrode 130 is closer to the touch side. In a case where the finger performs the touch operation, the additional touch driving electrode 130 may shield the touch driving electrode. Therefore, in order to counteract the shielding effect, the area of the touch driving electrode can be appropriately increased, and/or the first effective driving pulse signal can be increased. That is, the area of the additional touch driving electrode 130 is set to be smaller than the area of the touch driving electrode corresponding to the additional touch driving electrode 130; and/or the first effective driving pulse signal is set to be greater than the second effective driving pulse signal. FIG. 10 merely exemplarily shows that the touch driving electrode and the touch sensing electrode are disposed in the same layer. In other embodiments, the touch driving electrode and the touch sensing electrode may further be disposed in different layers, and the electrical insulation is implemented by providing the insulating layer between the plane where the touch driving electrode is located and the plane where the touch sensing electrode is located.

Figure 11:
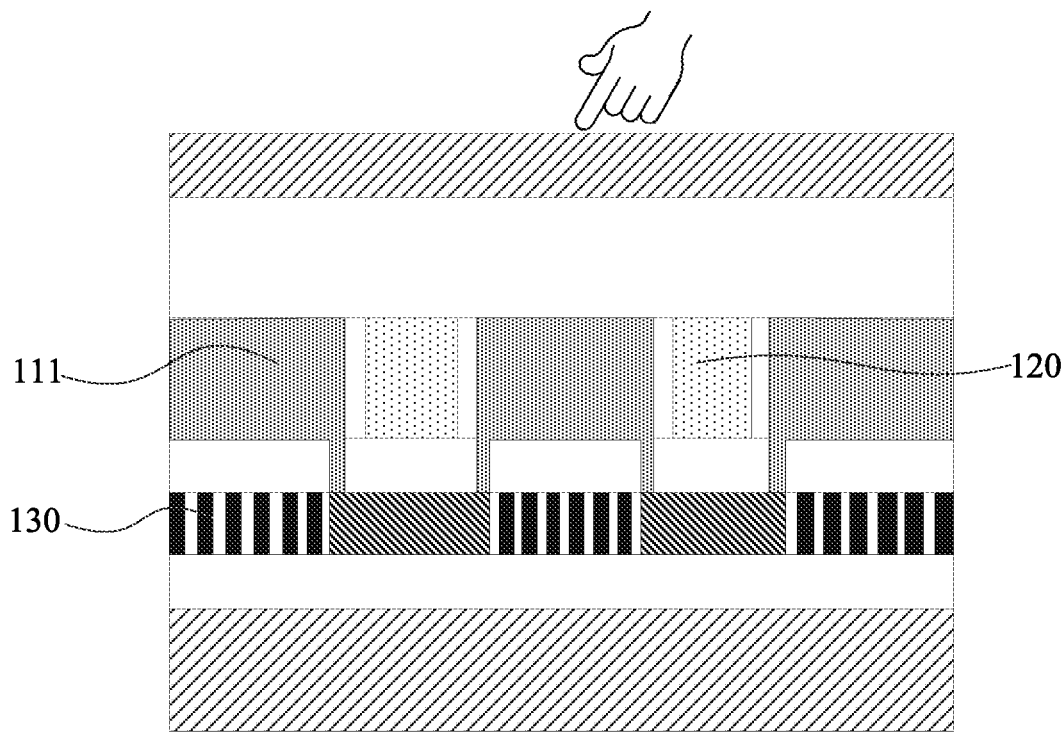
FIG. 11 is another partial cross-sectional view taken along the section line A-A' according to an embodiment of the present disclosure.

In one embodiment, one side, facing away from the additional touch driving electrode, of the touch driving electrode is the touch side. FIG. 11 is another partial cross-sectional view taken along the section line A-A' according to an embodiment of the present disclosure. Referring to FIG. 11, the area of the additional touch driving electrode 130 is larger than the area of the touch driving electrode corresponding to the additional touch driving electrode 130, and/or, the amplitude of the first effective driving pulse signal is smaller than the amplitude of the second effective driving pulse signal.

Exemplarily, as shown in FIG. 11, the touch driving electrode includes the plurality of sub-touch driving electrodes 111, and the plurality of sub-touch driving electrodes 111 are connected each other through the metal bridges 131. The touch driving electrode is closer to the touch side. In a case where the finger performs the touch operation, the touch driving electrode 130 may shield the additional touch driving electrode 130. Therefore, in order to counteract the shielding effect, the area of the additional touch driving electrode 130 can be appropriately increased, and/or the second effective driving pulse signal can be increased. That is, the area of the additional touch driving electrode 130 is set to be larger than the area of the touch driving electrode corresponding to the additional touch driving electrode 130; and/or the first effective driving pulse signal is set to be smaller than the second effective driving pulse signal. FIG. 11 merely exemplary shows that the touch driving electrode and the touch sensing electrode are disposed in the same layer. In other embodiments, the touch driving electrode and the touch sensing electrode may further be disposed in different layers, and the electrical insulation is implemented by providing the insulating layer between the plane where the touch driving electrode is located and the plane where the touch sensing electrode is located.

Based on the same inventive concept, the embodiment of the present disclosure further provides a touch display panel. FIG. 11 is a structural diagram of a touch display panel according to an embodiment of the present disclosure. The touch display panel provided in the embodiment of the present disclosure includes the touch structure provided in any of the embodiments described above.

Figure 12:
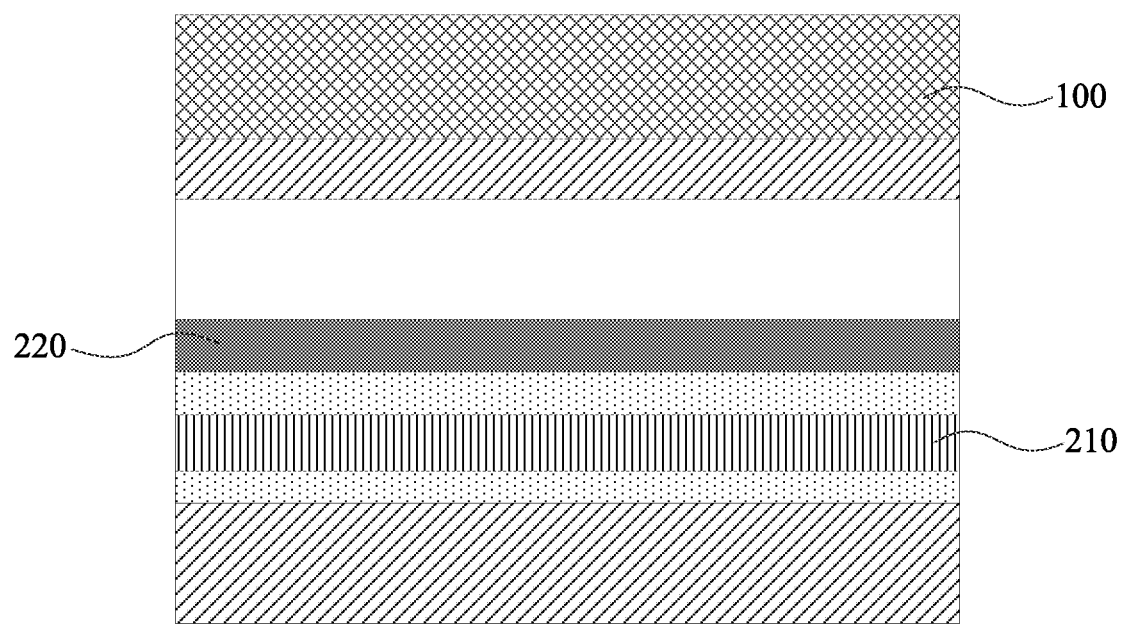
FIG. 12 is a partial cross-sectional view of a touch display panel according to an embodiment of the present disclosure.

It is to be noted that the touch structure described above may be embedded in a display panel, that is, in the display panel process, each film layer of the touch structure is disposed inside the display panel by the processes of coating, photoetching, etching and the like. The touch structure may also be manufactured separately on a substrate, and the touch structure is attached to a light-emitting side of the finished display panel. FIG. 12 exemplarily shows the latter structure.

Figure 13:
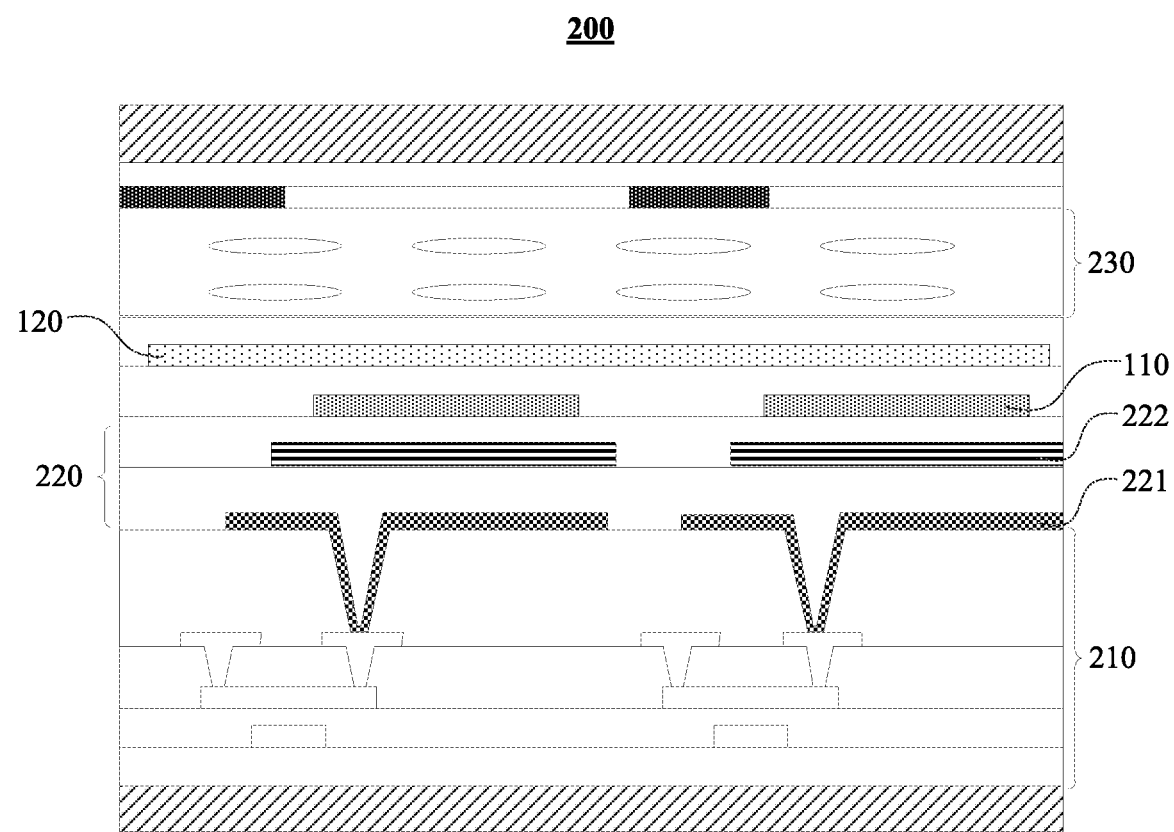
FIG. 13 is a partial cross-sectional view of another touch display panel according to an embodiment of the present disclosure.

FIG. 13 is a partial cross-sectional view of a touch display panel according to an embodiment of the present disclosure. As shown in FIG. 13, the touch display panel 200 includes a driving circuit layer 210 and a pixel unit array layer 220, and a plurality of touch driving electrodes 110 and a plurality of touch sensing electrodes 120 each are disposed on one side of the pixel unit array layer 220 facing away from the driving circuit layer 210.

Any one metal film layer in the driving circuit layer 210 or any transparent conducting layer in the pixel unit array layer 220 is reused as a plurality of additional touch driving electrodes.

The driving circuit layer 210 is configured to provide a driving signal for the pixel unit array layer 220 and generally includes a thin film transistor, a capacitor, and the like. Any metal film layer in the driving circuit layer 210 or any transparent conducting layer in the pixel unit array layer 220 is reused as the plurality of additional touch driving electrodes, and thus the process can be simplified. In addition, if any metal film layer in the driving circuit layer 210 is reused as the plurality of additional touch driving electrodes, since the driving circuit layer 210 is far away from a light-emitting surface, the reflected light of the metal film layer in the driving circuit layer 210 can be absorbed by each film layer of one side, facing towards the light-emitting surface, of the driving circuit layer 210 to prevent metal reflection from being visible. If any transparent conducting layer in the pixel unit array layer 220 is reused as the plurality of additional touch driving electrodes, since a light beam may pass through the transparent conducting layer, the amount of the light emitted from the light-emitting surface is not affected.

The touch display panel 200 provided in the embodiments of present disclosure has beneficial effects of the touch structure 100 described in the above-mentioned embodiments, and details are not described here again. In specific implementation, the touch display panel 200 may be a mobile phone touch display screen, a tablet computer touch display screen, a notebook computer touch display screen, and may also be any display apparatus with a touch display function such as a television touch display screen, a display region, a digital photo frame touch display screen, a navigator touch display screen, a smart wearable display touch display apparatus and the like, and the embodiments of the present disclosure are not particularly limited thereto.

In one embodiment, a source and drain electrode layer of the driving circuit layer 210 is reused as the plurality of additional touch driving electrodes.

In one embodiment, the touch display panel 200 may be a liquid crystal touch display panel. The pixel unit array layer 220 includes a pixel electrode 221 and common electrodes 222.

The common electrodes 222 are reused as the plurality of additional touch driving electrodes.

Figure 14:
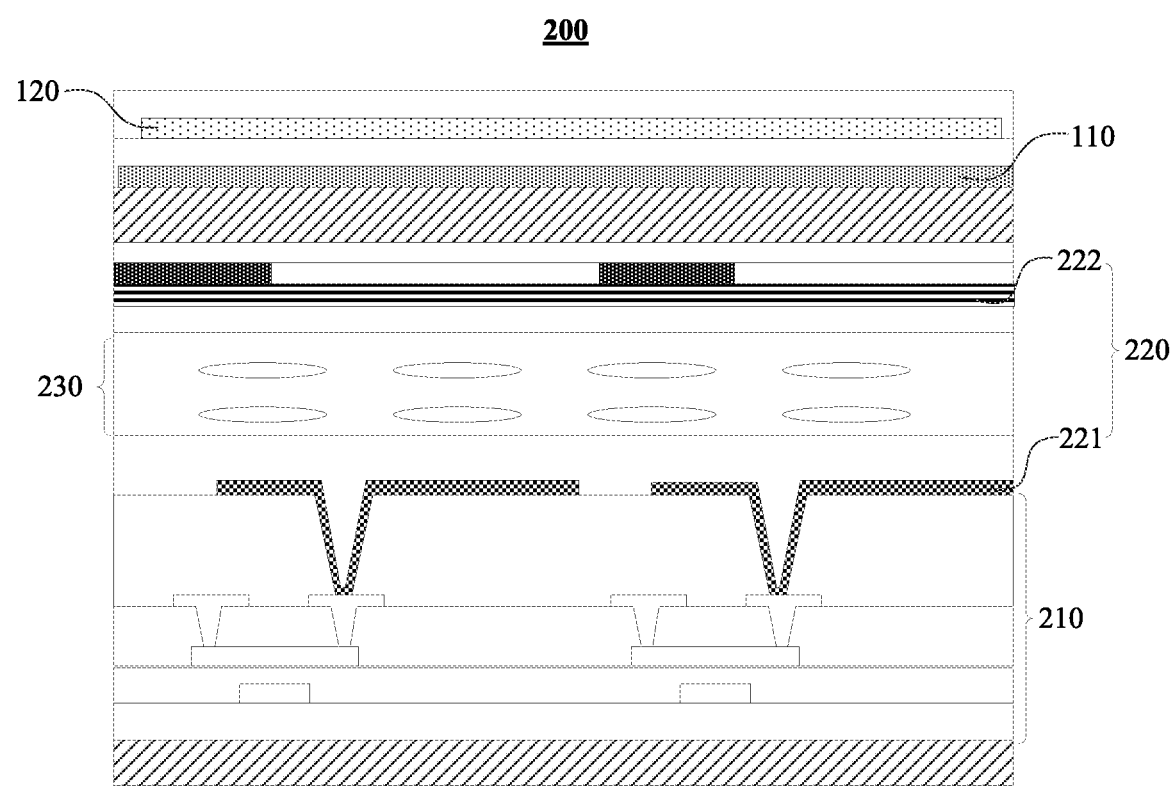
FIG. 14 is a partial cross-sectional view of another touch display panel according to an embodiment of the present disclosure.

Specifically, as shown in FIG. 13, the liquid crystal touch display panel includes an array substrate and a color filter substrate which are disposed opposite to each other, and a liquid crystal layer 230 disposed between the array substrate and the color filter substrate. FIG. 13 exemplarily shows that the pixel electrode 221 and the common electrode 222s are disposed in the array substrate. In other embodiments, the pixel electrode 221 may further be disposed in the array substrate, and the common electrodes 222 may further be disposed in the color filter substrate, and as shown in FIG. 14, FIG. 11 is a cross-sectional view of another touch display panel according to an embodiment of the present disclosure. In a case where the common electrode 222s are reused as the plurality of additional touch driving electrodes, the common electrodes 222 need to be divided into the plurality of additional touch driving electrodes, and each of the additional touch driving electrodes 130 is insulated from the other additional touch driving electrodes 130. In a display cycle, a common display potential is provided for the common electrode. In a touch cycle, the common electrode is used as the plurality of additional touch driving electrodes. If a touch operation is detected at a corresponding position of the touch driving electrode, after a first effective driving pulse signal of the touch driving cycle ends, a second effective driving pulse signal is applied to the additional touch driving electrode corresponding to the touch driving electrode. Referring to FIG. 13, one side, facing away from the driving circuit layer 210, of the common electrode 222 is provided with a plurality of touch driving electrodes 110, and one side, facing away from the driving circuit layer 210, of the plurality of touch driving electrodes 110 is provided with a plurality of touch sensing electrodes 120. In other embodiments, one side, facing away from the driving circuit layer 210, of the common electrode 222 may be provided with the plurality of touch sensing electrodes 120, and one side, facing away from the driving circuit layer 210, of the touch sensing electrode may be provided with the plurality of touch driving electrodes 110, as shown in FIG. 14. Relative positions of film layers of the plurality of touch driving electrodes 110 and the plurality of touch sensing electrodes 120 are not specifically limited. FIG. 13 and FIG. 14 exemplarily show that the touch driving electrode 110 and the touch sensing electrode 120 are disposed in different layers, and the electrical insulation is implemented by providing the insulating layer between the plane where the touch driving electrode is located and the plane where the touch sensing electrode is located. In other embodiments, the touch driving electrode 110 and the touch sensing electrode 120 may further be disposed in a same layer. In addition, for the film layer positional relationship, the pixel electrode 221 and the common electrode 222 may be disposed in different layers as shown in FIG. 13, and may also be insulated from each other and disposed in the same layer, and the embodiments of the present disclosure are not limited thereto.

Figure 15:
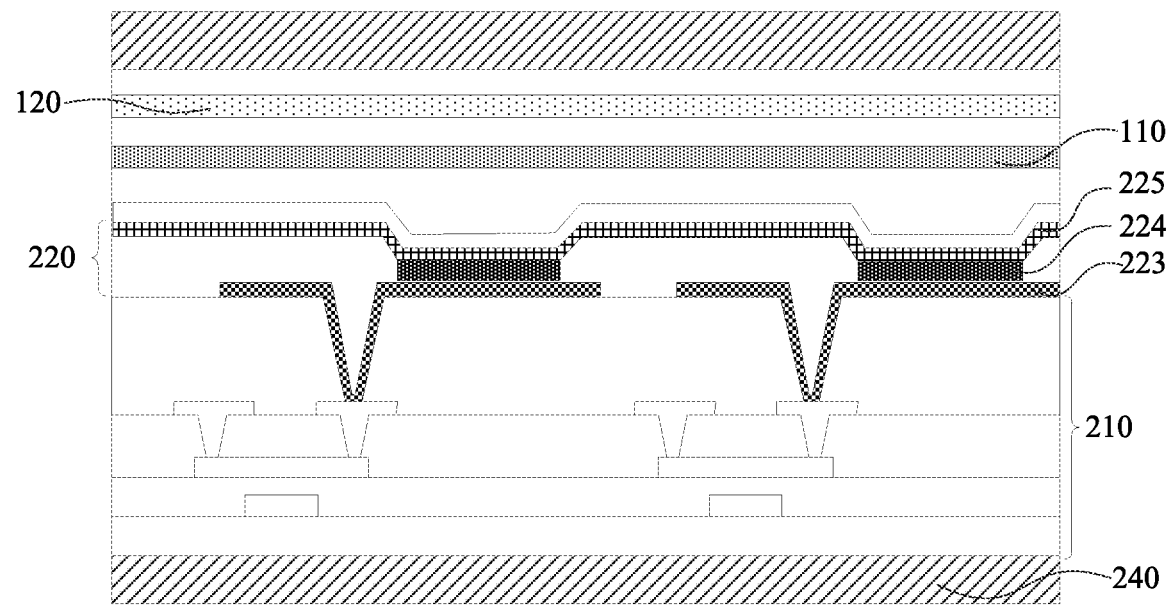
FIG. 15 is a partial cross-sectional view of another touch display panel according to an embodiment of the present disclosure.

In one embodiment, FIG. 15 is a cross-sectional view of another touch display panel according to an embodiment of the present disclosure. As shown in FIG. 15, the touch display panel 300 is an organic light-emitting touch display panel, and the pixel unit array layer 220 includes a plurality of organic light-emitting units, where the organic light-emitting unit includes an anode 223, a light-emitting functional layer 224 and a cathode 225.

The cathode 225 is reused as the additional touch driving electrode.

As shown in FIG. 5, the touch display panel 300 includes a base substrate 240, the base substrate 240 is provided with the driving circuit layer 210, the anode 223 is disposed on one side, facing away from the base substrate 240, of the driving circuit layer 210, the light-emitting functional layer 224 is disposed on one side of the anode 223 facing away from the base substrate 240, the cathode 225 is disposed on one side of the light-emitting functional 224 facing away from the base substrate 240, and the plurality of touch driving electrodes 110 are disposed on one side of the cathode 225 facing away from the base substrate 240. FIG. 15 exemplarily shows that the plurality of touch sensing electrodes 120 are disposed on one side, facing away from the base substrate 240, of the plurality of touch driving electrodes 110. Since the organic light-emitting units are susceptible to external moisture, an encapsulation layer can be covered on the organic light-emitting units. The plurality of touch driving electrodes 110 and the plurality of touch sensing electrodes 120 may be disposed in a laminated encapsulation layer, or may further be disposed on one side, facing away from the organic light-emitting units, of the encapsulation layer in the embodiments of the present disclosure. FIG. 15 exemplarily shows that the plurality of touch driving electrodes 110 and the plurality of touch sensing electrodes 120 are disposed in the laminated encapsulation layer.

In addition, relative positions of film layers of the plurality of touch driving electrodes 110 and the plurality of touch sensing electrodes 120 are not specifically limited. FIG. 15 exemplarily shows that the touch driving electrode 110 and the touch sensing electrode 120 are disposed in different layers, the electrical insulation is implemented by providing the insulating layer between the plane where the touch driving electrode is located and the plane where the touch sensing electrode is located, and the touch driving electrode 110 and the touch sensing electrode 120 may further be disposed in a same layer.

It is to be noted that in a case where the cathode 225 is reused as the additional touch driving electrodes, the cathode 225 needs to be divided into the plurality of additional touch driving electrodes that are insulated from each other. In a display cycle, a common display potential is provided for the cathode, and in a touch cycle, the cathode is used as the plurality of additional touch driving electrodes. If a touch operation is detected at a corresponding position of the touch driving electrode, after the first effective driving pulse signal of a touch driving cycle ends, the second effective driving pulse signal is applied to the additional touch driving electrode corresponding to the touch driving electrode.

In one embodiment, the touch display panel includes pixel units arranged in an array, the additional touch driving electrode includes a grid metal wire, and the additional touch driving electrode is disposed between two adjacent pixel units.

Since a black matrix is disposed between the adjacent pixel units, the opening rate of the touch display panel is not affected when the grid metal wire of the additional touch driving electrode is disposed between the adjacent pixel units, that is, when the additional touch driving electrode is disposed in a region where the black matrix is located, and at the same time, the additional touch driving electrode includes the grid metal wire, the impedance of the grid metal wire is large, the voltage drop is small, the value of capacitance between the additional touch driving electrode and the touch sensing electrode is large, and the accuracy of the touch operation detection is improved.

Based on the same inventive concept, an embodiment of the present disclosure further provides a driving method. The driving method is applicable to any touch structure provided in the embodiments of the present application.

Figure 16:
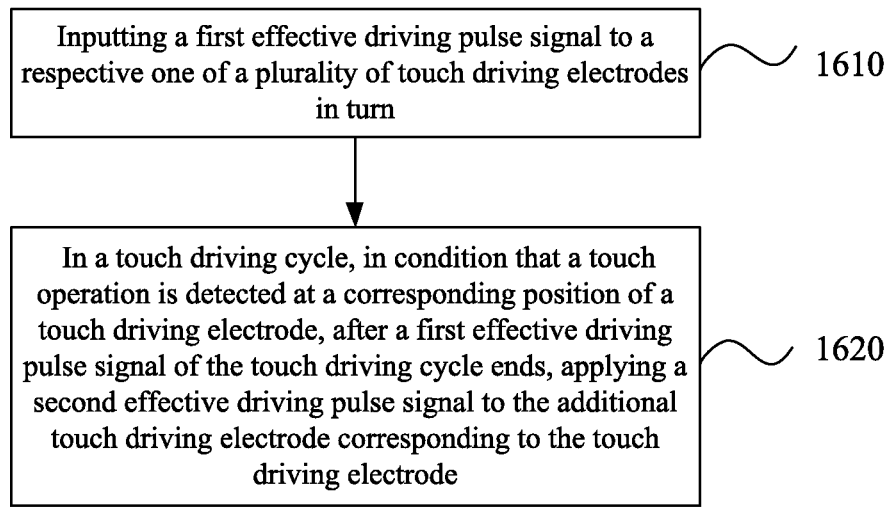
FIG. 16 is a flowchart of a driving method according to an embodiment of the present disclosure.

FIG. 16 is a flowchart of a driving method according to an embodiment of the present disclosure. As shown in FIG. 16, the driving method includes steps described below.

In step 1610, a first effective driving pulse signal is inputted to a respective one of a plurality of touch driving electrodes in turn.

In step 1620, in a touch driving cycle, in condition that a touch operation is detected at a corresponding position of a touch driving electrode, after a first effective driving pulse signal of the touch driving cycle ends, a second effective driving pulse signal is applied to the additional touch driving electrode corresponding to the touch driving electrode.

The step in which in each touch driving cycle, during the period when the first effective driving pulse signal is applied to the touch driving electrode, the touch position can be detected through the touch driving electrode and each touch sensing electrode; if the touch operation is detected, after the first effective driving pulse signal of the touch driving cycle ends, the second effective driving pulse signal is applied to the additional touch driving electrode corresponding to the touch driving electrode disposed at the position, and thus, in the time period without the first effective driving pulse signal, the touch position is detected through the additional touch driving electrode and the each touch sensing electrode, and the effect of improving the touch point reporting rate is achieved. For example, in a case where a game operation is performed and an operation of frequent touch clicks is required, a smooth single-point combo game operation experience is achieved.

What is claimed is:

1. A touch structure, comprising:
   a plurality of touch driving electrodes, a plurality of touch sensing electrodes and a plurality of additional touch driving electrodes, wherein the plurality of touch driving electrodes, the plurality of touch sensing electrodes and the plurality of additional touch driving electrodes are insulated from each other;
   wherein the plurality of touch driving electrodes extend along a first direction and are arranged along a second direction, the plurality of touch sensing electrodes extend along the second direction and are arranged along the first direction, and the plurality of additional touch driving electrodes extend along the first direction and are arranged along the second direction, wherein the first direction is intersected with the second direction;
   wherein each of the plurality of additional touch driving electrodes corresponds to a respective one of the plurality of touch driving electrodes, and the each of the plurality of additional touch driving electrodes at least has an overlapped portion with the respective one of the plurality of touch driving electrodes; and
wherein the each of the plurality of touch driving electrodes has a touch driving cycle, and in the touch driving cycle, in condition that a touch operation is detected at a corresponding position of the each of the plurality of touch driving electrodes, after a first effective driving pulse signal of the touch driving cycle ends, a second effective driving pulse signal is applied to a respective one of the plurality of additional touch driving electrodes corresponding to the each of the plurality of touch driving electrodes.

2. The touch structure of claim 1, wherein the plurality of additional touch driving electrodes comprise grid metal wires.

3. The touch structure of claim 2,
wherein the plurality of touch driving electrodes and the plurality of touch sensing electrodes are disposed in a same layer;
wherein the each of the plurality of touch driving electrodes comprises a plurality of sub-touch driving electrodes sequentially configured along the first direction, and two adjacent sub-touch driving electrodes of the plurality of sub-touch driving electrodes in the first direction are electrically connected to each other through a metal bridge; or each of the plurality of touch sensing electrodes comprises a plurality of sub-touch sensing electrodes sequentially configured along the second direction, and two adjacent sub-touch driving electrodes of the plurality of sub-touch sensing electrodes in the second direction are electrically connected to each other through the metal bridge; and
wherein the plurality of additional touch driving electrodes and the metal bridge are disposed in a same layer.

4. The touch structure of claim 3, further comprising a base substrate;
wherein the plurality of touch driving electrodes and the plurality of touch sensing electrodes are disposed on one side of the base substrate; and
wherein the metal bridge is disposed on one side, facing towards the base substrate, of a film layer where the plurality of touch driving electrodes are disposed.

5. The touch structure of claim 1, wherein an outline of the each of the plurality of additional touch driving electrodes coincides with an outline of the respective one of the plurality of touch driving electrodes.

6. The touch structure of claim 1, further comprising a virtual touch electrode, wherein the virtual touch electrode and the plurality of additional touch driving electrodes are insulated from each other and are disposed in a same layer; and
wherein the virtual touch electrode is disposed between two adjacent additional touch driving electrodes of the plurality of additional touch driving electrodes.

7. The touch structure of claim 1, wherein an area of the each of the plurality of additional touch driving electrodes is the same as an area of the respective one of the plurality of touch driving electrodes.

8. The touch structure of claim 1, wherein a value of capacitance between the each of the plurality of touch driving electrodes and a respective one of the plurality of touch sensing electrodes is $C_1$, and a value of capacitance between the respective one of the plurality of additional touch driving electrodes corresponding to the each of the plurality of touch driving electrodes and the plurality of touch sensing electrodes is $C_2$;

in condition that $C_1$ is equal to $C_2$, an amplitude of the first effective driving pulse signal is equal to an amplitude of the second effective driving pulse signal;
in condition that $C_1$ is greater than $C_2$, the amplitude of the first effective driving pulse signal is smaller than the amplitude of the second effective driving pulse signal; and
in condition that $C_1$ is less than $C_2$, the amplitude of the first effective driving pulse signal is greater than the amplitude of the second effective driving pulse signal.

9. The touch structure of claim 1, wherein a touch side is one side of the plurality of additional touch driving electrodes facing away from the plurality of touch driving electrodes;
wherein an area of the each of the plurality of additional touch driving electrodes is smaller than an area of the respective one of the plurality of touch driving electrodes corresponding to the each of the plurality of additional touch driving electrodes; and/or
wherein an amplitude of the first effective driving pulse signal is greater than a amplitude of the second effective driving pulse signal.

10. The touch structure of claim 1, wherein a touch side of the plurality of touch driving electrodes facing away from the plurality of additional touch driving electrodes;
wherein an area of the each of the plurality of additional touch driving electrodes is larger than an area of the respective one of the plurality of touch driving electrodes corresponding to the each of the plurality of additional touch driving electrodes; and/or
wherein an amplitude of the first effective driving pulse signal is smaller than a amplitude of the second effective driving pulse signal.

11. A touch display panel, comprising a touch structure, wherein the touch structure comprises:
a plurality of touch driving electrodes, a plurality of touch sensing electrodes and a plurality of additional touch driving electrodes, wherein the plurality of touch driving electrodes, the plurality of touch sensing electrodes and the plurality of additional touch driving electrodes are insulated from each other;
wherein the plurality of touch driving electrodes extend along a first direction and are arranged along a second direction, the plurality of touch sensing electrodes extend along the second direction and are arranged along the first direction, and the plurality of additional touch driving electrodes extend along the first direction and are arranged along the second direction, wherein the first direction is intersected with the second direction;
wherein each of the plurality of additional touch driving electrodes corresponds to a respective one of the plurality of touch driving electrodes, and the each of the plurality of additional touch driving electrodes at least has an overlapped portion with the respective one of the plurality of touch driving electrodes; and
wherein the each of the plurality of touch driving electrodes has a touch driving cycle, and in the touch driving cycle, in condition that a touch operation is detected at a corresponding position of the each of the plurality of touch driving electrodes, after a first effective driving pulse signal of the touch driving cycle ends, a second effective driving pulse signal is applied to a respective one of the plurality of additional touch driving electrodes corresponding to the each of the plurality of touch driving electrodes.

12. The touch display panel of claim 11, comprising a driving circuit layer and a pixel unit array layer, wherein the plurality of touch driving electrodes and the plurality of touch sensing electrodes are disposed on one side of the pixel unit array layer facing away from the driving circuit layer; and wherein one of metal film layers in the driving circuit layer or one of transparent conducting layers in the pixel unit array layer is reused as the plurality of additional touch driving electrodes.

13. The touch display panel of claim 12, wherein a source and drain electrode layer of the driving circuit layer is reused as the plurality of additional touch driving electrodes.

14. The touch display panel of claim 12, wherein the touch display panel is a liquid crystal touch display panel, and wherein the pixel unit array layer comprises pixel electrodes and common electrodes; and wherein the common electrodes are reused as the plurality of additional touch driving electrodes.

15. The touch display panel of claim 12, wherein the touch display panel is an organic light-emitting touch display panel, and wherein the pixel unit array layer comprises a plurality of organic light-emitting units, wherein each of the plurality of organic light-emitting units comprises an anode, a light-emitting functional layer and a cathode which are stacked;

wherein the cathode is reused as the plurality of additional touch driving electrodes.

16. The touch display panel of claim 11, comprising pixel units arranged in an array;

wherein a plurality of additional touch driving electrodes comprise grid metal wires; and wherein each of the plurality of additional touch driving electrodes is disposed between two adjacent pixel units among the pixel units arranged in the array.

17. A touch driving method, configured for driving a touch structure, wherein the touch structure comprises:

a plurality of touch driving electrodes, a plurality of touch sensing electrodes and a plurality of additional touch driving electrodes, wherein the plurality of touch driving electrodes, the plurality of touch sensing electrodes and the plurality of additional touch driving electrodes are insulated from each other;

wherein the plurality of touch driving electrodes extend along a first direction and are arranged along a second direction, the plurality of touch sensing electrodes extend along the second direction and are arranged along the first direction, and the plurality of additional touch driving electrodes extend along the first direction and are arranged along the second direction, wherein the first direction is intersected with the second direction;

wherein each of the plurality of additional touch driving electrodes corresponds to a respective one of the plurality of touch driving electrodes, and the each of the plurality of additional touch driving electrodes at least has an overlapped portion with the respective one of the plurality of touch driving electrodes; and wherein the each of the plurality of touch driving electrodes has a touch driving cycle, and in the touch driving cycle, in condition that a touch operation is detected at a corresponding position of the each of the plurality of touch driving electrodes, after a first effective driving pulse signal of the touch driving cycle ends, a second effective driving pulse signal is applied to a respective one of the plurality of additional touch driving electrodes corresponding to the each of the plurality of touch driving electrodes;

wherein the method comprises:

inputting the first effective driving pulse signal to a respective one of the plurality of touch driving electrodes in turn; and in a touch driving cycle, in condition that a touch operation is detected at a corresponding position of each of the plurality of touch driving electrodes, after the first effective driving pulse signal of the touch driving cycle ends, applying a second effective driving pulse signal to a respective one of a plurality of additional touch driving electrodes corresponding to the each of the plurality of touch driving electrodes.

* * * * *